INVENTOR
FRANK G. LOGAN
BY
Lawrence K. Sager
his ATTORNEY

June 26, 1951    F. G. LOGAN    2,558,572
ELECTRIC CONTROLLING APPARATUS
Filed June 9, 1945    2 Sheets-Sheet 2

INVENTOR
FRANK G. LOGAN
BY
Lawrence K. Sager
his ATTORNEY

Patented June 26, 1951

2,558,572

UNITED STATES PATENT OFFICE 2,558,572

ELECTRIC CONTROLLING APPARATUS

Frank G. Logan, Mount Vernon, N. Y., assignor to Ward Leonard Electric Company, a corporation of New York Application June 9, 1945, Serial No. 598,533

12 Claims. (Cl. 322—25)

1

This invention relates to regulating apparatus and is applicable particularly to the regulation of the voltage of an alternating current generator supplying a load circuit wherein the power factor may vary considerably over a wide range due to the current lagging or leading with reference to the electromotive force of the generator. It also relates to the method of control.

This invention is an improvement over that disclosed in the pending application of John F. Hysler Serial No. 481,550, filed April 2, 1943, and which resulted in Patent No. 2,396,851, granted March 19, 1946. That application discloses the regulation of the voltage of an alternating current generator by combining voltage responsive means with a control which is responsive to change of power factor and to change of load for controlling the exciting field current of the generator to maintain the required voltage under variable load current, power factor and voltage changes.

The main object of the present invention is to accomplish these results by a relationship of the parts which will cause the control currents to effectively act in the same sense as the changes in the output of the generator and thereby secure a more rapid response to such changes with greater inherent stability of control. Other objects and advantages will be understood from the following description and accompanying drawings showing preferred embodiments of the invention.

Figure 1:
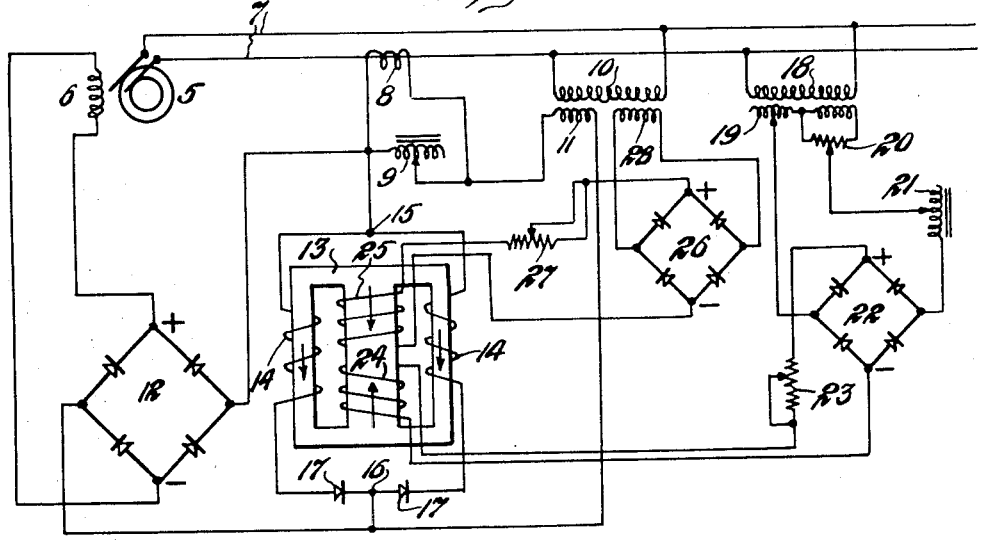
Figure 2:
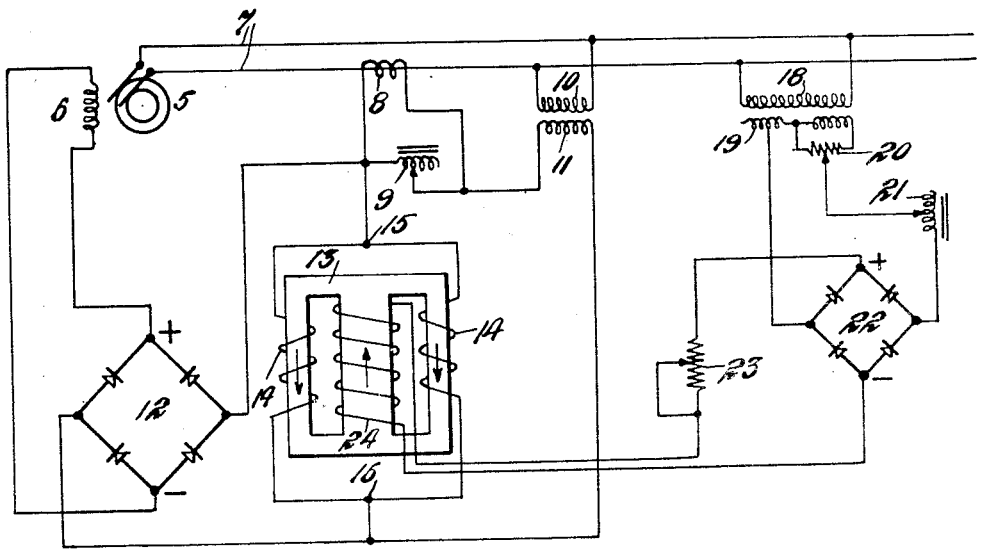
Figure 3:
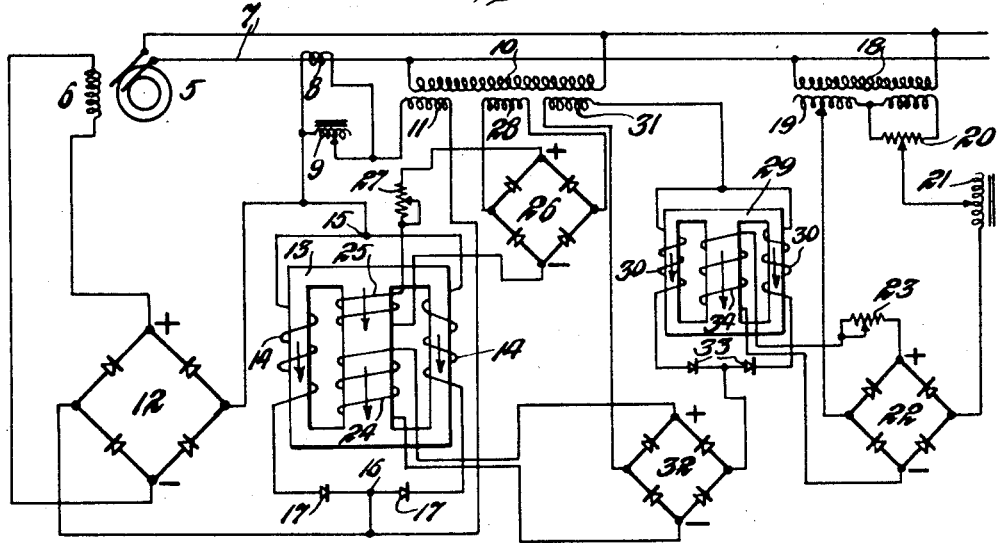
Figure 4:
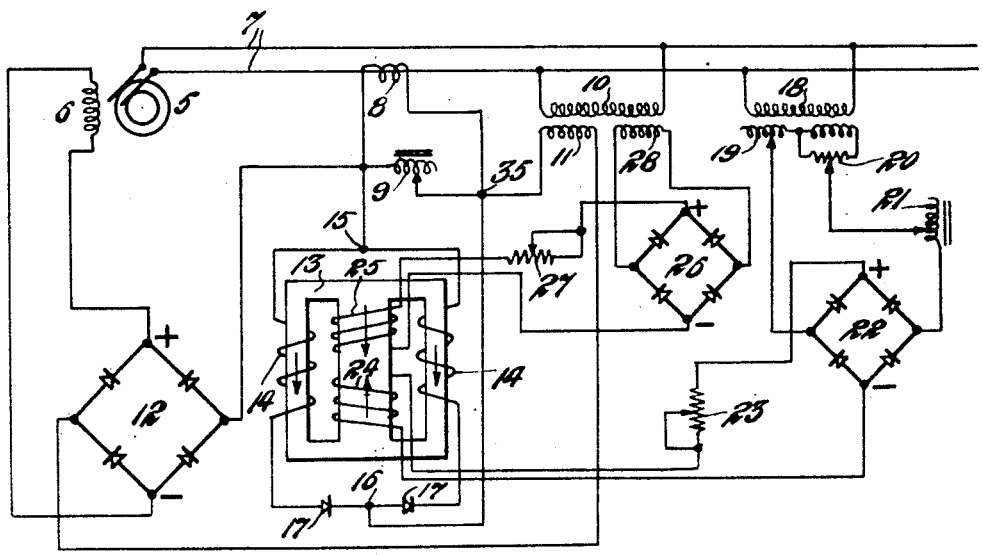

Fig. 1 is a diagram showing the invention applied to regulating the voltage of an alternating current generator; and Figs. 2, 3 and 4 are diagrams showing various modifications.

Referring to Fig. 1, a single phase alternating current generator 5 having a field winding 6 is indicated as supplying the power lines 7.

The voltage responsive to the change of power factor of the load and to the load current is derived from a current transformer 8 related to one of the supply lines. The phase of the current in the winding of this transformer is dependent upon and changes with the phase of the load current in its relation to the phase of the electromotive force of the supply line; and the value of the current in the transformer will correspond with that of the load current. An adjustable impedance device 9 is shown connected across the terminals of the current transformer for the purpose of securing a proper phase relationship and value of the electromotive force derived therefrom to the phase of another electromotive force related to that of the line voltage.

2

The impedance device 9 is indicated as an inductive winding for the purpose of causing the electromotive force at its terminals to be out of phase a considerable amount, such as 90° under conditions of unity power factor of the load, with reference to the phase of the electromotive force which is dependent upon the phase of the line voltage. The adjustable inductive device 9 is shown for simplicity but may be a capacitor, a resistive device, or various combinations of inductive, resistive or capacitive devices for obtaining the proper value and proper phase relationship of the electromotive force derived from the current transformer.

A transformer having a primary winding 10 is shown connected across the supply lines. A secondary 11 of this transformer is shown having one terminal connected to the current transformer and device 9 and the other terminal of the secondary 11 is connected to a rectifier 12. This rectifier is indicated as of the bridge-connected copper oxide type, the other alternating terminal of which is connected to the other side of the current transformer and device 9. The rectifier 12 supplies direct current to the field winding 6 of the generator which winding is connected to the positive and negative terminals of the rectifier. The circuit containing the current responsive means 8 and 9 and the secondary winding 11 in series with each other is directly connected to the rectifier 12 with the result that the current response due to change of load current or change in power factor of the load current is directly applied to the rectifier 12, giving a quicker controlling effect on the rectifier than would be the case if other controlling means were interposed in this circuit.

The direct controlling effect of this current responsive circuit may simply be explained by assuming that the impedance device 9 is adjusted to impose upon the circuit connected to the rectifier 12 an electromotive force having a proper value and a phase difference of say 90° from the electromotive force imposed upon this circuit by the secondary winding 11 under conditions of unity power factor. The vector resultant of the electromotive force derived from the current responsive means and the electromotive force derived from the transformer 11 is the voltage which will be applied to the rectifier 12 for affecting the control responsive to load current and change of power factor.

Obviously if the load current increases in value, the electromotive force applied to the rectifier 12 and field winding 6 of the generator will be increased and raise the generator voltage to compensate for the increased load. Now as to effect of change of phase, assume that the generator load has been changed to cause a lagging current in the load circuit. This would cause the electromotive force derived from the current responsive means 8 and 9 to lag correspondingly; and the connections in the control circuit are such as to cause the increased lag of the current responsive electromotive force to more nearly approach the electromotive force derived from the line voltage. This decrease of the 90° relationship obviously results in an increased vector sum of the combined electromotive forces giving an increase in the electromotive force applied to the rectifier 12 and to the field winding 6. This, of course, increases the excitation of the generator to compensate for the effect of the increased lag in the load current. The greater the lag of the load current, the more nearly the phases of the electromotive force derived from the current responsive means and from the line approach each other in their vector relationship and correspondingly increase the resultant voltage applied to the rectifier and field winding of the generator. Thus changes due to a lagging current in the load circuit are automatically compensated for by direct response of the rectifier and generator field winding thereto. When the power factor of the load current decreases from unity due to a leading load current, the phase of the electromotive force derived from the current responsive means shifts from its assumed 90° relationship away from the phase of the voltage derived from the line. This results in decreasing the vector sum of these electromotive forces; and the greater the lead of the load current the less will be the value of the resultant electromotive force applied to the rectifier and field winding. Thus, any decrease in power factor due to an increase in leading current of the load, the less will be the excitation of the field winding of the generator which thereby decreases the generator voltage in accordance with the proper control for a leading load current. Thus the circuit receiving the combined voltages from the current responsive means and from the line voltage responsive means not only controls the voltage of the generator to compensate for changes in the load current but also for changes in the power factor of the load. Although it was assumed for purposes of explanation that the electromotive force derived from the current responsive means was displaced in phase 90° from the electromotive force derived from the line under unity power factor conditions, it is evident that such phase displacement of these electromotive forces may be other than 90° for adaptation to particular situations.

The means for controlling the voltage of the generator in response to small deviations from the desired voltage is obtained by control of a reactor which in turn affects the voltage applied to the rectifier 12 mainly by the reactive effect of the reactor upon the current responsive means. A reactor is shown having a three-legged core 13, the three-leg form being shown for simplicity, although any other suitable form of core and relationship of windings might be used. A main winding 14 is shown on each of the outside legs of the core connected in parallel with each other from a common junction 15 to a common junction 16; but there is interposed in the circuit of each of these windings an electric valve or half-wave rectifier 17. These valves are connected in the reverse sense so as to deliver an alternating current from the junction 16. These main supply windings 14 and their rectifiers are connected in parallel or in shunt to the current responsive means 8, 9, and the secondary winding 11; and are also connected in parallel or in shunt to the rectifier 12. Thus the junction 15 is connected to a point between the current responsive means and the rectifier 12 and the junction 16 is connected to a point between the winding 11 and the rectifier 12.

The voltage responsive control for affecting the reactor in response to changes of the line voltage is indicated as comprising a transformer having a primary winding 18 connected across the supply lines and having a secondary winding 19. A portion of the secondary winding 19 is bridged by a variable rheostat 20 from which an adjustable connection is made to the winding 21 of an adjustable inductive device. Connection therefrom is made to one terminal of a full wave rectifier 22 indicated of the bridge-connected copper oxide type. The opposite terminal of this rectifier is adjustably connected to the secondary winding 19. The device 21 in its relation to the secondary winding 19 serves to amplify the small changes in the output voltage of the generator and results in the rectifier 22 delivering a direct current amplified in its variations in response to the amplified changes of the line voltage. The direct current output from the rectifier 22 is supplied through adjustable resistance 23 to a control winding 24 on the reactor 13. The directions of the magnetizing forces of the currents of windings 14 on the reactor are indicated by arrows as in a downward direction in the two outer legs of the reactor core which would cause the flux due thereto to pass in an upward direction through the middle leg. The magnetizing force of the current of the winding 24, as indicated by the arrow thereon, is in an upward direction through the middle leg of the core and thus acts cumulatively with the windings 14. Another winding 25 is indicated on the middle leg of the core and is supplied from a rectifier 26 through an adjustable resistance 27. The rectifier 26 is shown as supplied with alternating current from the secondary 28 of the transformer having the primary winding 10. The magnetizing force of the current of the winding 25 is in a direction opposing that of the windings 14 and 24 and is for the purpose of maintaining the magnetization of the core in a region below the knee of the saturation curve thereby causing the controlling action of the reactor to be worked on a steep portion of the magnetization curve for amplifying the response.

The controlling action in response to small changes of the output voltage of the generator will be understood by first considering the effect of a slight decrease in the line voltage. This decrease is amplified to cause a considerably larger decrease in the voltage supplied to the rectifier 22 and a considerable decrease in the direct current therefrom to the winding 24. This decreases the magnetization of reactor core 13 resulting in increasing the reactance and impedance of the windings 14. This in turn increases the impedance of the circuit through the current responsive means 8, 9 and the secondary winding 11 and through the main windings 14; and the increase of impedance of this circuit supplied by the current transformer 8 increases the output voltage of the current transformer. This increase in the current transformer voltage in turn increases the voltage supplied to the rectifier 12 and increases the excitation of the field winding 6 of the generator. The voltage of the generator is thereby increased to compensate for the decrease in line voltage reflected through the voltage responsive control. A further aiding action in raising the voltage of the generator results from the fact that the increase in reactance of the windings 14 increases the voltage at the terminals 15 and 16 of the circuits of these windings which tends to raise the voltage supplied to the rectifier 12 as these terminals are connected directly thereto. When the voltage of the generator increases above the normal value, the reverse action takes place, with increased current in the winding 24 increasing the flux density of the core 13 and thereby reducing the reactance of the windings 14. The resulting decrease in the impedance of the circuits supplied by the current transformer lowers the output voltage of the current transformer resulting in a decrease in voltage supplied to the rectifier 12 and field winding 6 for reducing the output voltage of the generator. Although any increase or decrease of the line voltage would have some effect on the current supplied to the winding 25, such action is more than offset by the much greater change of current in the control winding 24.

It should be noted that the controlling action of the voltage responsive winding 24 is in the same sense as the change in line voltage and thereby directly affects the flux density of the reactor in the proper sense for securing the desired counter-action of any change of generator voltage. Also the circuit of the current responsive means and the secondary winding 11 is directly connected to the rectifier 12 without the inclusion of the reactor in this circuit as in the case of the disclosures of said Hysler application. These improved direct actions of the present invention result in a faster response to changes in the load current, power factor of the load and output voltage of the generator and also increase the stability of control.

Fig. 2 is the same as Fig. 1 except that the main windings 14 on the reactor core have no electric valves or rectifiers included in their circuits; and the winding 25 with its source of supply is omitted because it may not always be desirable in the form of Fig. 2. The controlling action as regards response to change in line voltage, load current and power factor of the load is the same as described with reference to Fig. 1, except that in Fig. 2 a wider range of control voltage supplied to the winding 24 would be required for obtaining equivalent results.

In some cases it may be desirable to cause the control winding 24 of the reactor 13 to act in opposition to the magnetizing force of the currents of the main windings 14, in which case the response to change of line voltage must be opposite to that considered in Fig. 1. Fig. 3 is an example of one such embodiment of the invention. In this figure the parts correspondingly numbered are the same as those of Fig. 1 and function in the same manner except as to the reversal of the action of winding 24. In Fig. 3 an amplifying reactor having a core 29 is introduced between the rectifier 22 and the control winding 24. The reactor 29 is shown provided on its outer legs with the windings 30 which are connected in parallel between a terminal of the secondary winding 31 and a terminal of a rectifier 32 through electric valves or rectifiers 33 for supplying an alternating current to the rectifier 32. The other terminal of the secondary winding 31 is connected to the rectifier 32. The direct current output of this rectifier is supplied to the control winding 24 of the main reactor. A voltage responsive control winding 34 on the central leg of the reactor 29 is supplied with direct current from the rectifier 22. The magnetizing force of the current of winding 34 is in opposition to that of the windings 30.

The voltage control of the disclosures of Fig. 3 will be understood by first considering a decrease below normal of the line voltage. This results in a decrease of current supplied to the winding 34 of the auxiliary amplifying reactor 29 and increases the flux density of this reactor. This permits more current to pass through the current windings 30 and increases the current supplied to the control winding 24 of the main reactor from the rectifier 32. In view of the magnetizing force of the current of winding 24 being in opposition to the magnetizing force of the currents of windings 14, the increase of current in winding 24 results in a decrease of the flux density in the reactor core which increases the reactance and impedance of the windings 14. This increase of impedance of the circuit of the current transformer 8 increases the voltage supplied thereby with a resulting increase in the excitation of the generator for restoring the voltage, as already explained with reference to Fig. 1. When an increase above normal of the line voltage occurs, the reverse action takes place, the increased current supplied to the winding 34 of the auxiliary reactor causing a decrease in its resultant flux which increases the reactance of the windings 30. This in turn reduces the current supplied to the rectifier 32 and control winding 24. The decrease in the magnetizing effect of the winding 24 decreases the impedance of the windings 14 by the resultant increase in the flux density of the core 13. Thus the impedance of the circuit supplied by the current transformer 8 is decreased which lowers the voltage supplied by the current transformer to its circuit and thereby lowers the alternating current voltage supplied to the rectifier 12 and the direct current voltage supplied to the field winding 6 of the generator.

Fig. 4 is the same as Fig. 1 except the connection of the main current windings 14 and rectifiers 17 to the circuit supplied by the current transformer 8. In Fig. 1 these reactor windings and rectifiers are connected in shunt to the current responsive means and secondary winding 11 but in Fig. 4 these windings and rectifiers are connected in shunt to the current responsive means as shown by the connection of the junction point 16 to the junction point 35 between the current responsive means and the secondary winding 11. The apparatus of Fig. 4 functions in the same manner as described with reference to Fig. 1 except by reason of the fact that the current reactor windings 14 and rectifiers 17 being connected directly across the current responsive means, the response of the current transformer to change of impedance of this circuit is more direct and of greater range in its controlling effect than in the disclosures of Fig. 1. This results in some amplification of the voltage responsive control in the disclosures of Fig. 4 over the apparatus of Fig. 1.

The reactor of Fig. 4 may obviously be replaced by the form of reactor shown in Fig. 2 wherein the rectifiers 17 are not utilized. Likewise the form of reactor of Fig. 2 could be utilized in place of the main or auxiliary reactors of Fig. 3; and it is also evident that the connections of the current reactor windings 14 of the disclosures of Figs. 2 and 3 could be directly connected in shunt or in parallel to the current responsive means as in Fig. 4.

In some cases where it may not be necessary to provide control responsive to change of phase of the load current, the winding 11 or means for deriving an electromotive corresponding to that of the line current may be omitted. In the case of such omission the control of the generator would then be responsive to change of load current and to change of the output voltage and function in the manner already described.

Although the foregoing disclosures are in simplified form, it will be understood that various additional auxiliary devices may be utilized where desired and that control means may be provided for change of circuit connections from non-operating to operatnig conditions and from manual control of the generator voltage to the automatic control. Also instead of directly exciting the field of the main generator from the controlling apparatus, an exciter may be provided for exciting the main field of the generator, the field of the exciter being controlled by the apparatus disclosed. Also instead of applying the invention to a single phase alternating current supply system which is shown for simplicity, the invention may be applied in the usual manner to polyphase systems.

It will be apparent that various modifications of the invention may be made for adaptation to particular requirements without departing from the scope of the invention.

I claim:

1. Controlling apparatus for an alternating current generator comprising a current transformer related to the load circuit of the generator for deriving therefrom an electromotive force variable with the load, rectifying means connected to the output circuit of said transformer, a reactor having a main winding directly connected to said output circuit of the transformer in parallel with reference to said transformer, an additional winding on said reactor for affecting the flux thereof and responsive to change of voltage of the generator, and means for applying the output of said rectifying means to control the voltage of the generator.

2. Controlling apparatus for an alternating current generator comprising a current transformer related to the load circuit of the generator for deriving therefrom an electromotive force variable with the load, rectifying means connected to the output circuit of said transformer, a reactor having a main winding directly connected across said rectifying means in parallel with said output circuit, an additional winding on said reactor for affecting the flux thereof and responsive to change of voltage of the generator, and means for applying the output of said rectifying means to control the voltage of the generator.

3. Controlling apparatus for an alternating current generator comprising a current transformer related to the load circuit of the generator for deriving therefrom an electromotive force variable with the load, rectifying means connected to the output circuit of said transformer, a reactor having a main winding directly connected to said circuit across the terminals of said transformer, an additional winding on said reactor for affecting the flux thereof and responsive to change of voltage of the generator, and means for applying the output of said rectifying means to control the voltage of the generator.

4. Controlling apparatus for an alternating current generator comprising a current transformer related to the load circuit of the generator for deriving therefrom an electromotive force variable with the load, rectifying means connected to the output circuit of said transformer, a reactor having a main winding directly connected to said output circuit of the transformer in parallel with reference to said transformer, an additional winding on said reactor responsive to change of voltage of the generator for increasing the reactance of said first named winding upon decrease of the generator voltage and for decreasing the reactance of said first named winding upon increase of the generator voltage, and means for applying the output of said rectifying means to control the voltage of the generator.

5. Controlling apparatus for an alternating current generator comprising a current transformer related to the load circuit of the generator for deriving therefrom an electromotive force variable with the load, rectifying means connected to the output circuit of said transformer, a reactor having a main winding directly connected to said output circuit of the transformer in parallel with reference to said transformer, an additional winding on said reactor responsive to change of voltage of the generator having the magnetizing force of its current acting cumulatively with the magnetizing force of the current of said first named winding, and means for applying the output of said rectifying means to control the voltage of the generator.

6. Controlling apparatus for an alternating current generator comprising a current transformer related to the load circuit of the generator for deriving therefrom an electromotive force variable with the load, rectifying means connected to the output circuit of said transformer, a reactor having a main winding directly connected to said circuit in parallel with reference to said transformer, an additional winding on said reactor responsive to change of voltage of the generator having the magnetizing force of its current acting in opposition to the magnetizing force of the current of said first named winding, and means for applying the output of said rectifying means to control the voltage of the generator.

7. Controlling apparatus for an alternating current generator comprising a current transformer related to the load circuit of the generator for deriving therefrom an electromotive force variable with the load current and variable in phase with the phase of the load current, means for deriving from the load circuit an electromotive force having its phase dependent upon the phase of the electromotive force of the load circuit, rectifying means connected to the output circuit of said combined derived electromotive forces, a reactor having a main winding directly connected to said circuit in parallel with reference to said transformer, an additional winding on said reactor for affecting the flux thereof and responsive to change of voltage of the generator, and means for applying the output of said rectifying means to control the voltage of the generator.

8. Controlling apparatus for an alternating current generator comprising a current transformer related to the load circuit of the generator for deriving therefrom an electromotive force variable with the load current and variable in phase with the phase of the load current, means for deriving from the load circuit an electromotive force having its phase dependent upon the phase of the electromotive force of the load circuit, rectifying means connected to the output circuit of said combined derived electromotive forces, a reactor having a main winding directly connected across said rectifying means in parallel with said output circuit, an additional winding on said reactor for affecting the flux thereof and responsive to change of voltage of the generator, and means for applying the output of said rectifying means to control the voltage of the generator.

9. Controlling apparatus for an alternating current generator comprising a current transformer related to the load circuit of the generator for deriving therefrom an electromotive force variable with the load current and variable in phase with the phase of the load current, means for deriving from the load circuit an electromotive force having its phase dependent upon the phase of the electromotive force of the load circuit, rectifying means connected to the output circuit of said combined derived electromotive forces, a reactor having a main winding directly connected to said circuit across the terminals of said transformer, an additional winding on said reactor for affecting the flux thereof and responsive to change of voltage of the generator, and means for applying the output of said rectifying means to control the voltage of the generator.

10. Controlling apparatus for an alternating current generator comprising a current transformer related to the load circuit of the generator for deriving therefrom an electromotive force variable with the load current and variable in phase with the phase of the load current, means for deriving from the load circuit an electromotive force having its phase dependent upon the phase of the electromotive force of the load circuit, rectifying means connected to the output circuit of said combined derived electromotive forces, a reactor having a main winding directly connected to said circuit in parallel with reference to said transformer, an additional winding on said reactor responsive to change of voltage of the generator for increasing the reactance of said first named winding upon decrease of the generator voltage and for decreasing the reactance of said first named winding upon increase of the generator voltage, and means for applying the output of said rectifying means to control the voltage of the generator.

11. Controlling apparatus for an alternating current generator comprising a current transformer related to the load circuit of the generator for deriving therefrom an electromotive force variable with the load current and variable in phase with the phase of the load current, means for deriving from the load circuit an electromotive force having its phase dependent upon the phase of the electromotive force of the load circuit, rectifying means connected to the output circuit of said combined derived electromotive forces, a reactor having a main winding directly connected to said circuit in parallel with reference to said transformer, an additional winding on said reactor responsive to change of voltage of the generator having the magnetizing force of its current acting cumulatively with the magnetizing force of the current of said first named winding, and means for applying the output of said rectifying means to control the voltage of the generator.

12. Controlling apparatus for an alternating current generator comprising a current transformer related to the load circuit of the generator for deriving therefrom an electromotive force variable with the load current and variable in phase with the phase of the load current, means for deriving from the load circuit an electromotive force having its phase dependent upon the phase of the electromotive force of the load circuit, rectifying means connected to the output circuit of said combined derived electromotive forces, a reactor having a main winding directly connected to said circuit in parallel with reference to said transformer, an additional winding on said reactor responsive to change of voltage of the generator having the magnetizing force of its current acting in opposition to the magnetizing force of the current of said first named winding, and means for applying the output of said rectifying means to control the voltage of the generator.

FRANK G. LOGAN.

REFERENCES CITED

The following references are of record in the file of this patent:

UNITED STATES PATENTS

| Number | Name | Date |
|---|---|---|
| 2,066,919 | West | Jan. 5, 1937 |
| 2,378,765 | Garr | June 19, 1945 |

FOREIGN PATENTS

| Number | Country | Date |
|---|---|---|
| 834,163 | France | Aug. 8, 1938 |